UNITED STATES PATENT OFFICE.

RAYMOND PATTERSON WHEELOCK, OF SEARCHLIGHT, NEVADA.

PROCESS FOR PRODUCING METALS FROM ORES.

996,179.    Specification of Letters Patent.    Patented June 27, 1911.

No Drawing.    Application filed February 19, 1910.  Serial No. 544,876.

*To all whom it may concern:*

Be it known that I, RAYMOND P. WHEE-LOCK, a citizen of the United States, residing at Searchlight, in the State of Nevada, have invented new and useful Improvements in Processes for Producing Metals from Ores, of which the following is a specification.

The invention described relates to the process of extracting gold and silver from their ores by means of a solution of cyanid of an alkali or alkaline earth metal, such as potassium, sodium, barium, etc., and is a process for the regeneration of said solution. In other words, it is a process for the recovery of the cyanogen, present in the solution in combination with the various metals which it may have dissolved, as cyanid of an alkali or alkaline earth metal in condition to be available for further ore treatment.

The object of the process is the cheapening of the cyanid process and the increasing of its efficiency. The cheapening is brought about by the smaller original consumption of cyanid, if this process is used, particularly in cases where cyanicids such as copper give rise to a large consumption. The increase in efficiency will result upon the removal from the cyanid solution of the inactive base metals which are precipitated by this regeneration process. The decrease in cost and increase in efficiency will increase the adaptability of the regular cyanid process.

Generally speaking, the results of the present regeneration process are first, the precipitation of such base metals as copper, lead, zinc, etc., which may have been dissolved from the ore treated or introduced into the solution at some other stage of the regular cyanid process; second, the precipitation of any gold or silver in the solution such gold or silver either being that which has been left for precipitation by this process or has escaped precipitation by other regular methods employed for that purpose; third, the recovery of a large proportion of the cyanogen combined with the above metals in soluble compounds, and its conversion, by union with an alkali or an alkaline earth metal, into a form suitable for subsequent ore treatment; and fourth the freeing of the solution from inactive elements which tend to impair its efficiency.

Having thus set forth generally the objective results of my improved process, said process will now be set forth in detail.

Sufficient acid is added to the cyanid solution to be treated, to neutralize any alkalinity of the solution and to precipitate, as simple cyanids, the metals held in solution as double cyanids of the metals and the alkalis or alkaline earth metals present. The amount of acid required is easily determined by a simple laboratory test. For instance several hundred cubic centimeters of the cyanid solution under treatment being taken, an acid, advisedly diluted, is added drop by drop until precipitation ceases and no further precipitate is produced upon the addition of more acid. Sulfuric acid is preferable for this purpose both on account of its cheapness and on account of the possibility of eliminating the sulfate radical later in the process.

One half of the cyanogen present as a double cyanid of a metal, and an alkali or alkaline earth metal is liberated when the simple cyanids are thus precipitated. By union with the hydrogen of the acid, this liberated cyanogen forms hydrocyanic acid, which is a gas, but is held by the solution if care is used to prevent undue agitation or exposure of the solution. It is advisable to perform this portion of the process in a closed receptacle, though other methods may be satisfactorily used.

Taking copper as a typical case and employing my method, if sulfuric acid is used as a precipitant, the chemical equation of the reaction upon the addition of the acid is probably

$$H_2SO_4 + K_2Cu_2Cy_4 = K_2SO_4 + 2HCy + Cu_2Cy_2.$$

The precipitate formed is separated from the solution by filtration, decantation or both. With the solution carrying the hydrocyanic acid, is mixed sufficient of a soluble alkali or alkaline earth metals, preferably in the form of an oxid or hydrate, to render the solution distinctly alkaline even after the alkalinity due to any cyanid present has been neutralized by some such reagent as silver nitrate. The preferable alkaline oxid or hydrate is calcium oxid or hydrate in the form of unslaked or slaked commercial lime, both on account of its cheapness and because the major portion of the sulfate radical present, if sulfuric acid has been used, is precipitated as calcium sulfate. Following out this step in the process and again citing copper as a typical case, the reaction which takes place when sulfuric acid and lime are employed is probably

$$K_2SO_4 + 2HCy + Ca(OH)_2 = CaSO_4 + 2KCy + 2H_2O.$$

The precipitate resulting from this second step in the process is separated from the solution and the resultant clear cyanid solution is ready for the further treatment of ore.

The precipitate resulting from the addition of the acid and containing the base metals and any precipitated gold and silver values may be disposed of in the precipitated form or the cyanogen and metals may be separated as a part of this process as follows: Add to the precipitate a quantity of acid sufficient to effect solution of the soluble constituents. Then treat the whole solution in a retort or other suitable air tight vessel to which heat can be applied and which is fitted with a tube or pipe leading therefrom. The free end of this tube or pipe is placed beneath the surface of a solution of an alkali or alkaline earth hydrate contained in another vessel. The first vessel is heated until the hydrocyanic acid resulting from the solution of the precipitate in the acid is driven off, and conducted through the tube to the other vessel containing alkali or alkaline earth hydrate. The hydrocyanic acid is absorbed by the solution of the alkaline hydrate in the second vessel and this absorption results in a reaction between the hydrocyanic acid and the alkali or alkaline earth hydrate which gives rise to the formation of a cyanid of the alkali or alkaline earth metal present and water. The result is a solution of a cyanid of an alkali or alkaline earth metal, while the metals contained in the original precipitate are left in the first vessel in forms depending upon the acid used as a solvent and may be recovered, if their value warrants it, by ordinary chemical means which are not within the scope of this process.

It will be evident from the above that my process as a supplement to and improvement in the regular cyanid process, is well adapted for the extraction of gold and silver from their ores, at a minimum cost and in large quantities, thus fitting it for use in commercial connections and where economical production is desired.

What I claim and desire to secure by Letters Patent of the United States, is:—

1. A process for regenerating cyanid solutions carrying base metals in the form of soluble double cyanids consisting in recovering the considerable portion of the cyanogen existing as a component part of the double cyanids, by the addition of acid which precipitates the metals as simple cyanids, the removal of said precipitate and its further treatment with acid, the application of heat to separate the metals and cyanogen forming the simple cyanid, and the absorption of the hydrocyanic acid thus formed by a solution of alkali or alkaline earth hydrate to form a solution of a simple cyanid of an alkaline earth metal or alkali.

2. A process for regenerating cyanid solutions carrying base metals in the form of soluble double cyanids consisting in recovering the cyanogen existing as a component part of the double cyanids, by first separating the double cyanids by precipitation then applying heat to break up the simple cyanids as metals and cyanogen, and then absorbing the hydrocyanic acid formed by the addition of an alkali or alkaline earth hydrate.

3. A process for regenerating cyanid solutions carrying base metals in the form of soluble double cyanids consisting in the addition of acid to precipitate said metals as simple cyanids, the removal of the said precipitate and its further treatment with acid and the application of heat to separate the metals and cyanogen forming the simple cyanid and the absorption of the hydrocyanic acid thus formed by a solution of an alkali or alkaline earth hydrate to form a solution of a simple cyanid of an alkali or alkaline earth.

In testimony whereof I have hereunto set my hand in presence of two subscribing witnesses.

RAYMOND PATTERSON WHEELOCK.

Witnesses:
PETER A. PERLOT,
VICTOR TROISE.

Copies of this patent may be obtained for five cents each, by addressing the "Commissioner of Patents, Washington, D. C."